United States Patent [19]

Marshall

[11] Patent Number: 5,156,051
[45] Date of Patent: Oct. 20, 1992

[54] VIBRATION TEST FIXTURE

[75] Inventor: Philip Marshall, Lexington, Mass.

[73] Assignee: M/RAD Corporation, Woburn, Mass.

[21] Appl. No.: 731,372

[22] Filed: Jul. 16, 1991

Related U.S. Application Data

[63] Continuation of Ser. No. 622,366, Dec. 5, 1990, abandoned, Continuation of Ser. No. 362,757, Jun. 7, 1989, abandoned.

[51] Int. Cl.⁵ ............................................. G01N 29/00
[52] U.S. Cl. ......................................... 73/663; 73/662
[58] Field of Search ................. 73/662, 663, 665, 667, 73/668

[56] References Cited

U.S. PATENT DOCUMENTS

| | | |
|---|---|---|
| 3,712,120 | 1/1973 | Fletcher et al. ........................ 73/663 |
| 4,848,160 | 7/1989 | Marshall et al. ....................... 73/663 |
| 5,083,463 | 1/1992 | Marshall et al. ....................... 73/663 |

FOREIGN PATENT DOCUMENTS 1174807  8/1985  U.S.S.R. ............................... 73/663

*Primary Examiner*—Louis Arana
*Attorney, Agent, or Firm*—Pandiscio & Pandiscio

[57] ABSTRACT

A vibration test apparatus for applying simultaneously three equal vibration forces which extend along three mutually-orthogonal axes to a test object so that each of the forces extends parallel to a corresponding respective one of three mutually-orthogonal axes of the object. The apparatus comprises a fixture adapted for attachment to a conventional shaker table or a sliptable. The fixture supports the test object in selected angular relationship relative to the shaker table or sliptable. This angular relationship is selected so that the input vibration force generated by the shaker table is translated into the three equal forces, each of which extends parallel to a corresponding respective one of the three mutually-orthogonal axes of the test object.

10 Claims, 3 Drawing Sheets

VIBRATION TEST FIXTURE

This is a continuation of copending application(s) Ser. No. 07/622,366 filed on Dec. 5, 1990, now abandoned which was in turn a continuation of Ser. No. 07/362,757 filed on Jun. 7, 1989 now abandoned.

FIELD OF THE INVENTION

The present invention relates to apparatus for vibration testing selected objects, and more particularly to fixtures and jigs used in conjunction with apparatus for generating a vibration force.

BACKGROUND OF THE INVENTION

In conjunction with the design and testing of various products, e.g. consumer electronic goods and military products, vibration forces are applied to the product along selected axes thereof to determine if the product can tolerate such forces and continue to function properly. Because it is typically time consuming and somewhat difficult to attach and detach an object to be vibration tested from a vibration source, e.g. a shaker table, fixtures have been developed for facilitating mechanically coupling the object with the vibration source. These fixtures generally comprise a base which is securely attached to the vibration source and at least one mounting surface to which the object to be vibration tested can be quickly and easily attached.

One such fixture is disclosed in British patent application Ser. No. 8,522,501, filed Sep. 11, 1985. This fixture has a cubic shape. The object to be vibration tested is attached to one face of the cube and another face of the cube is secured to a vibration source. By releasing the cube from the vibration source after a vibration test is completed and rotating the former about its diagonal axis 120 degrees, a new face of the cube is positioned for attachment to the vibration source. By this selective rotation of the cubic fixture, vibration forces can be applied along three mutually-orthogonal axes of the object without the need for removing the object from the test fixture after each test. Rotation of the cubic fixture is effected either manually or by means of an electric motor.

Another vibration test apparatus is disclosed in U.S. patent application Ser. No. 265,310, filed Oct. 25, 1988, now U.S. Pat. No. 4,848,160. The latter apparatus comprises a cubic fixture for supporting an object to be vibration tested, a head expander positioned between the cubic fixture and a vibration source, an index assembly for raising the cubic fixture away from and lowering the cubic fixture onto the head expander, and a rotation assembly for rotating the cubic fixture about its diagonal axis when the fixture is raised above the head expander. The apparatus also includes a controller for automatically raising, rotating and lowering the cubic fixture so that vibration testing can be performed along three mutually-orthogonal axes of the test object without detaching the object or the cubic fixture on which it is supported from the vibration source during the three-test sequence.

Although the vibration test apparatus of application Ser. No. 265,310 functions satisfactorily in most circumstances, where, for instance, objects are vibration tested in assembly-line fashion using unskilled or low-skilled personnel, it has been determined that the '310 apparatus can be too complicated for the average employee to operate. As such, vibration testing must be performed using fixtures which require detachment of the test object and/or fixture after a vibration test is performed along each of the axes of the object of interest. Clearly, it is undesirable from a work efficiency perspective, where a multiple axis vibration test is to be performed, to attach and detach an object after each of the vibration tests.

OBJECTS AND SUMMARY OF THE INVENTION

An object of the present invention is to provide a vibration test fixture adapted for attachment to a conventional shaker table or a conventional sliptable attached to a shaker table, which fixture is designed to support a test object relative to the shaker table so that the object can be vibration tested along three mutually-orthogonal axes thereof in a single vibration test procedure without repositioning the object during the procedure.

Another object of the present invention is to provide a vibration test apparatus for simultaneously applying three equal vibration forces extending along mutually-orthogonal axes to a test object having mutually-orthogonal X, Y and Z axes so that the three vibration forces extend along or in parallel with a corresponding respective one of the X, Y and Z axes of the object.

These and other objects are achieved by a vibration test fixture for testing an object having mutually-orthogonal X, Y and Z axes. The test fixture is adapted for coupling with a conventional shaker table or a convention sliptable attached to a shaker table. The test fixture comprises a flat plate assembly having a straight bottom edge and means for supporting the test object in selected fixed relationship with the flat plate. The support means is designed to support the test object so that the X and Y axes thereof form a 45° angle with the bottom edge of the flat plate assembly.

In one embodiment of the present invention the flat plate assembly, and hence a test object secured to the support means thereof, is inclined at about a 54.7° angle with respect to the mounting surface of the shaker table to which the test fixture is secured. As a result of this inclination, the Z axis of the test object is also inclined at about 35.3° with respect to the mounting surface of the shaker table. In another embodiment of the present invention, the flat plate assembly, and hence a test object secured to the support means thereof, is inclined at about a 35.3° angle with respect to the mounting surface of the sliptable to which the test fixture is secured. As a result of this inclination the Z axis of the test object is inclined at about a 54.7° angle with respect to the mounting surface of the sliptable.

By supporting the test object in these selected positions with respect to the mounting surface of the shaker table or sliptable, and thus with respect to the axis of the vibration force, each of three equal, mutually-orthogonal vibration force components of the input vibration force extend along or in parallel with corresponding respective ones of the X, Y and Z axes of the test object.

BRIEF DESCRIPTION OF THE DRAWINGS

For a fuller understanding of the nature and objects of the present invention, reference should be had to the following detailed description taken in connection with the accompanying drawings wherein.

In the drawings like reference numerals refer to like parts.

DETAILED DESCRIPTION OF THE INVENTION

Figure 1:
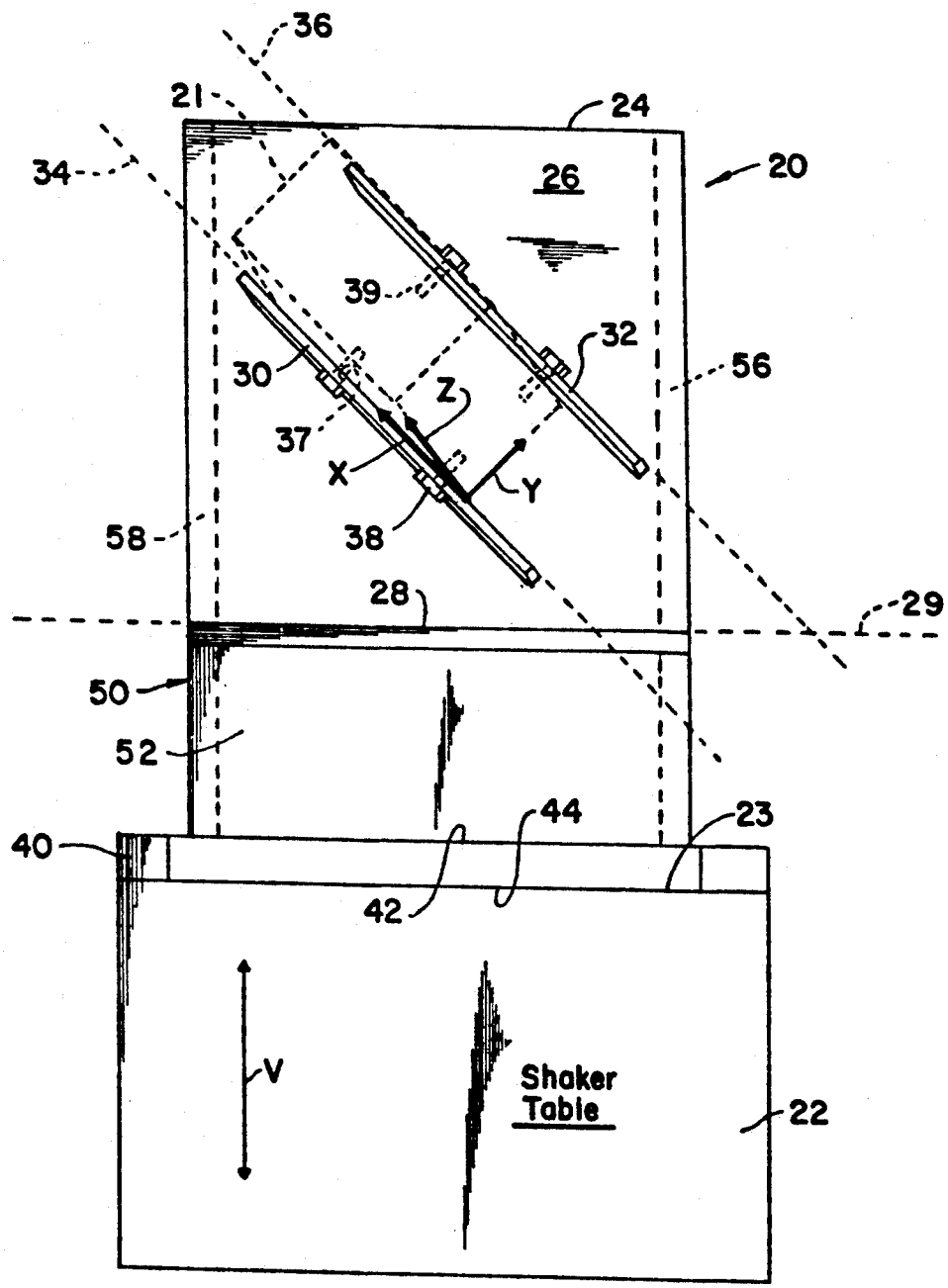
FIG. 1 is a front elevation view of the vibration test apparatus of the present invention and a schematically-illustrated shaker table to which the apparatus is secured.
Figure 2:
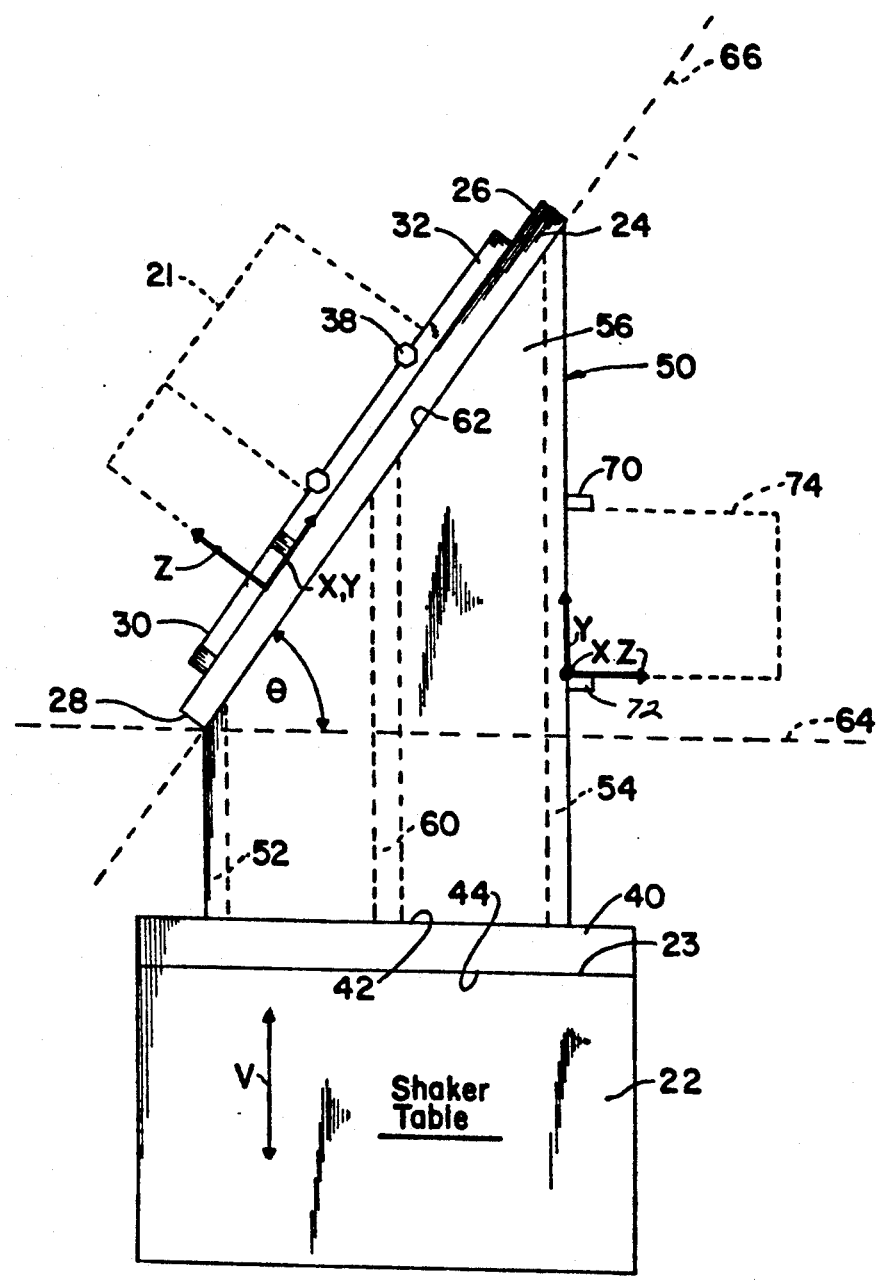
FIG. 2 is a side elevation view of the apparatus and shaker table illustrated in FIG. 1.

Referring now to FIGS. 1 and 2, the present invention is a test fixture 20 adapted for use with a conventional shaker table 22, e.g., a shaker table of the type manufactured by Unholtz-Dickie Corporation of Wallingford, Conn. and identified by model number T-1000. Fixture 20 is designed to support a test object 21 having mutually-orthogonal X, Y and Z axes (see FIG. 1) in fixed, predetermined relationship with respect to a substantially flat mounting surface on which fixture 20 is supported. As described in greater detail hereinafter the mounting surface may be either the top surface 22 of a shaker table 23 or the top surface 80 of a sliptable 82.

Test fixture 20 comprises a top plate 24 having a substantially flat top surface 26. Top plate 24 is made from a material having suitable strength and vibration-transmissive characteristics, such as magnesium plate having a thickness of about one inch. Top plate 24 comprises a substantially straight bottom edge 28 which extends along an axis 29.

Fixture 20 comprises support means for securing test object 21 to top plate 24 so that the X and Y axes of the object form a 45° angle with bottom edge axis 29. Such support means may comprise, for example, a pair of elongate members 30 and 32 attached to top surface 26 of top plate 24 so as to confront top surface 26 along their entire length. Members 30 and 32 extend in parallel and are spaced apart a distance such that a test object 21 may be readily attached thereto, as described hereinafter. Members 30 and 32 are positioned so that their respective axes of elongation 34 and 36 form a 45° angle with axis 29 along which bottom edge 28 extends.

Members 30 and 32, by virtue of their selectively aligned attachment to top surface 26 of plate 24, provide a structural connection by which a test object 21 can be quickly and easily attached to and detached from top surface 26 and by which the test object can be supported in fixed, selected angular relationship with top surface 26 and axis 29 of bottom edge 28. To this end, members 30 and 32 contain conventional mechanism and/or structure for securing object 21 to the members 30 and 32. Such mechanism and/or structure may comprise, for instance, a series of holes 37 in members 30 and 32 through which a corresponding number of bolts 38 are inserted and screwed into correspondingly-positioned threaded apertures 39 in an object 21 received between members 30 and 32.

Holes 37 in members 30 and 32 and threaded apertures 39 in test object 21 are positioned so that when test object 21 is bolted to members 30 and 32, (a) the X axis of the object extends parallel to the long axes 34 and 36 of members 30 and 32, (b) the Y axis of the object extends normally to long axes 34 and 36, and (c) the Z axis of the object extends normally to top surface 26 on top plate 24. Additionally, the X and Y axes of a test object 21 secured to members 30 and 32 form a 45° angle with respect to axis 29 of straight bottom edge 28. As those of ordinary skill in the art will readily appreciate other connection structure may be substituted in place of holes 37, bolts 38 and apertures 39 so long as the alternative structure securely attaches test object 21 to members 30 and 32 and ensures object 21 remains aligned in the manner described above during the entire vibration test.

As those of ordinary skill in the art will additionally appreciate, the support means for attaching test object 21 to top plate 24 may comprise structure other than elongate members 30 and 32. Such alternative structure must support the object so that its X and Y axes extend at 45° angles to axis 29 and so that the Z axis of the test object extends normally to top surface 26 of top plate 24.

As noted above, test fixture 20 is adapted to be attached to either the mounting surface of a sliptable or a shaker table. When it is desired to attach test fixture 20 to the mounting surface 22 of a shaker table 23, fixture 20 comprises a bottom plate 40 having parallel top and bottom surfaces 42 and 44. Surfaces 42 and 44 are substantially flat. Bottom plate 40 is adapted to be attached to mounting surface 23 of shaker table 22 by conventional means, e.g. by bolting plate 40 to mounting surface 23. When plate 40 is attached to mounting surface 23 of shaker table 22, top surface 42 of plate 40 extends in parallel with mounting surface 23.

Test fixture 20 further comprises a support member 50 for securing top plate 24 to bottom plate 40 and for supporting top plate 24 in fixed angular relationship with mounting surface 23 of shaker table 22. Briefly, support member 50 may be a box-like structure, the top portion of which above inclined plane 66 has been removed. Thus in FIGS. 1 and 2, the illustrated support member 50 comprises front wall 52, rear wall 54, right wall 56, left wall 58 and intermediate wall 60. Walls 52, 54 and 60 extend in parallel and walls 56 and 58 extend in parallel with one another and extend normally relative to walls 52, 54 and 56. Walls 52, 54, 56 and 58 are secured together by welding or other suitable method so as to form a rigid, box-like structure. Intermediate wall 60 is positioned between wall 52 and 54 and is attached to walls 56 and 58 to provide extra rigidity to the structure. Walls 52, 54, 56, 58 and 60 are attached to bottom plate 40 by welding or other suitable means so that the walls extend normally to top surface 42 of plate 40. Preferably, walls 52-60 are made from plate-like material having satisfactory strength and vibration-transmissive characteristics, e.g. one inch thick magnesium plate.

Front wall 52 is much shorter than rear wall 54, i.e. the top edge of the front wall is closer to top surface 42 of base plate 40 than is the top edge of rear wall 54. Right wall 56 has a top edge 62 that extends upwardly from the junction of wall 56 with front wall 52 to the junction of wall 56 with rear wall 54 so that top edge 62 forms an angle $\theta$ with plane 64 (FIG. 2). The latter extends parallel to top surface 42 of base plate 40. The top edge (not shown) of left wall 58 also extends upwardly at an angle $\theta$ relative to plane 64. Angle $\theta$ is preferably equal to 54.7°, although some slight variation (±0.5°) about this angle is acceptable.

The top edges of walls 52, 54, 56, 58 and 60 all terminate at plane 66 which is inclined at angle $\theta$ with respect to plane 64. Top plate 24 is attached to top edges of walls 52-60 by bolting or other suitable means so that top surface 26 of plate 24 extends parallel to plane 66 and so that the plate remains firmly attached to support member 50 during the entire vibration test.

By attaching top plate 24 to support member 50 in this manner, top surface 26 is inclined at the angle $\theta$ with respect to mounting surface 23 of shaker table 22. As a result of their attachment to surface 26, the support means for attaching test object 21 to top plate 24 (e.g. elongate members 30 and 32) are also inclined at the angle $\theta$ relative to mounting surface 23. Similarly, because the Z axis of a test object 21 secured to elongate members 30 and 32 extends normally to top surface 26, the Z axis of the test object forms an angle of $90°\text{-}\theta$ with respect to the plane along which mounting surface 23 of shaker table 22 extends, e.g., 35.3° when $\theta = 54.7°$.

Support member 50 optionally comprises a pair of elongate members 70 and 72 for supporting a test object 74 having mutually orthogonal X, Y and Z axes in fixed orthogonal relationship with mounting surface 23 of shaker table 22. Elongate members 70 and 72 are attached to the outer surface of rear wall 54 so that the long axes thereof extend in parallel with one another and extend parallel to top surface 42 of bottom plate 40. Members 70 and 72 contain conventional structure (e.g. selectively positioned bolt holes and associated bolts) for releasably attaching a test object 74 thereto so that the X axis of the object extends normally to rear wall 54, so that the Y axis of the object extends normally to top surface 42 of bottom plate 40 and so that the Z axis of the object extends parallel to the long axes of the members. As such, when a test object 74 is attached to members 70 and 72 the X, Y and Z axes of the object extend in orthogonal relationship with mounting surface 23 of shaker table 22. Of course, the object can be repositioned so that the X axis of the object extends normally to top surface 42 or parallel to the long axes of member 70 and 72.

To use the vibration test apparatus of the present invention, bottom plate 40 is attached to mounting surface 23 of shaker table 22 by conventional means, e.g. by bolting the plate to the mounting surface. Because top plate 24 is attached to support member 50, and support member 50 is attached to bottom plate 40, attaching bottom plate 40 to shaker table 22 attaches the entire test fixture 20 to the shaker table. As such, vibration forces V generated by shaker table 22 are transmitted via bottom plate 40, support member 50, top plate 24, and the support means (e.g. elongate members 30 and 32) to a test object 21 secured to the former.

Vibration force V is generated by shaker table 22 so as to extend along an axis that extends normally to mounting surface 23, and hence normally to top surface 42 of bottom plate 40, as noted above. According to basic principles of vector mechanics, a given force can be broken down into different combinations of force components each having a unique pair of magnitude and orientation values. Adding these components together vectorially produces the original force. Thus, an upwardly acting vibration force V generated by shaker table 22 can be broken down into a set of three equal force components which extend along mutually orthogonal axes, which components when added together are equal to the original vibration force V. Each of these force components has a magnitude equal to about 0.577 times the magnitude of vibration force V.

Test fixture 20 is designed to support test object 21 relative to mounting surface 23, and hence to vibration force V, so that each of the three mutually orthogonal X, Y and Z axes of the test object extend along or in parallel with a corresponding respective one of the above-mentioned three equal, mutually-orthogonal force components of the upwardly acting vibration force V. Resultantly, vibration forces equal to 0.577 times the magnitude of vibration force V are applied simultaneously to test object 21 along each of the three mutually-orthogonal X, Y and Z axes thereof. Test object 21 is therefore vibration tested along its X, Y and Z axes simultaneously.

By supporting test object 21 in the manner described above with respect to mounting surface 23 of shaker table 22, vibration testing is simplified because the test object does not have to be repositioned after vibration testing along each of three mutually-orthogonal axes of the object. With known vibration test apparatus, an object is first vibration tested along its X axis, repositioned and vibration tested along its Y axis, and then repositioned again and vibration tested along its Z axis. Especially where vibration testing is performed by unskilled personnel or where it is essential that the vibration testing be performed in as little time as possible, the vibration test apparatus of the present invention is highly advantageous inasmuch as the test object does not have to be repositioned for testing along each of its three mutually axes.

Elongate members 70 and 72 are arranged so that the three mutually-orthogonal axes of test object 74 are supported in orthogonal relationship with mounting surface 23 of shaker table 22. Consequently, test object 74 must be repositioned after a vibration test is completed along each of its three mutually-orthogonal axes. Although it is intended that test objects will generally be attached to elongate member 30 and 32 of fixture 20, elongate members 70 and 72 are provided in the event it is desired to perform a single or dual axis vibration test.

Alternate Embodiment

Figure 3:
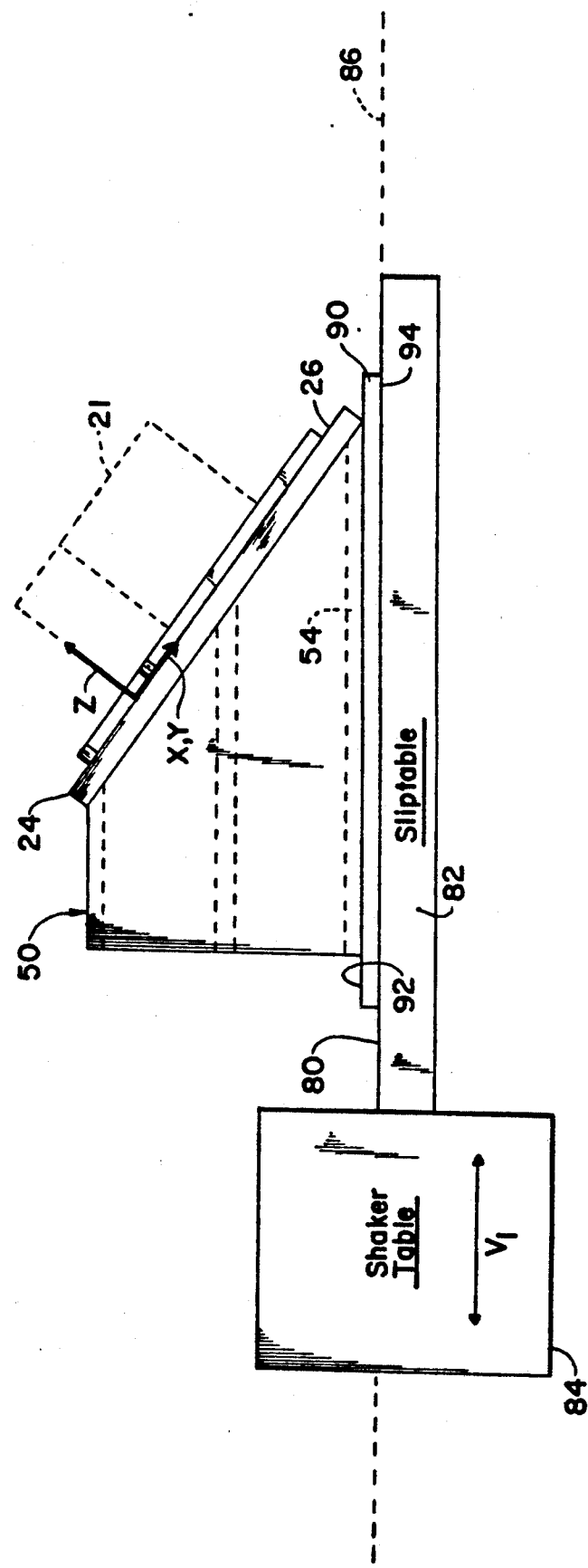
FIG. 3 is a side elevation view of the vibration test apparatus illustrated in FIG. 1, a schematically-illustrated sliptable to which the apparatus is secured, and a schematically-illustrated shaker table coupled with the sliptable.

Referring now to FIGS. 1-3, in certain circumstances it may be desirable to secure test fixture 20 to the top surface 80 of a sliptable 82. As is well known, sliptables are adapted to support an object being vibration tested so as to permit the object to be moved back and forth along a horizontal plane. Typically, the sliptable 82 is attached to a shaker table 84 which is oriented so that the vibration force $V_1$ which it generates extends along a horizontal plane. Thus, when the shaker table 84 is activated, it causes sliptable 82 to reciprocatably vibrate along horizontal plane 86.

When it is intended that test fixture 20 will be attached to top surface 80 of sliptable 82, fixture 20 includes a back plate 90 which is attached by welding or other suitable means to back wall 54. Back plate 90 has flat top and bottom surface 92 and 94 and is made from a suitable vibration transmissive material such as one inch thick magnesium plate. Bottom surface 94 of plate 90 forms a $90°\text{-}\theta$ angle with top surface 26 of top plate 24. As discussed above, $\theta$ is preferably equal to about 54.7°, with the result that bottom surface 94 forms about a 35.3° angle with top surface 26. As such, the Z axis of a test object 21 mounted to top plate 24 forms a 54.7° angle with bottom surface 94 and the X and Y axes of the test object form a 35.3° angle with bottom surface 94.

When test fixture 20 is to be mounted interchangeably to a shaker table and a sliptable, back plate 90 is provided in addition to bottom plate 40. Where test fixture 20 is to be mounted only on a sliptable, back plate 90 is provided in lieu of bottom plate 40.

Except for the addition of back plate 90, the vibration test fixture of the alternative embodiment illustrated in FIG. 3 is identical to the test fixture described above and illustrated in FIGS. 1 and 2.

To use the vibration test fixture illustrated in FIG. 3, the fixture is positioned so that bottom surface 94 of back plate 90 contacts top surface 80 of sliptable 82. Back plate 90 is then attached to top surface 80 by conventional means, e.g. by bolting the back plate to the top surface. Shaker table 84 is then activated. The latter produces a vibration force $V_1$, which is transmitted to sliptable 82 so as cause the latter to reciprocatably vibrate along horizontal plane 86. This reciprocatal vibration is transmitted via back plate 90 to test fixture 20 and to test object 21 attached thereto. As discussed above with respect to upwardly acting vibration force V generated by shaker table 23, vibration force $V_1$, generated by shaker table 84 can be broken down into three equal, mutually-orthogonal X, Y and Z axes. When test fixture 20 is attached, via back plate 90, to sliptable 82, each of the three mutually orthogonal X, Y and Z axes of the test object extend along or in parallel with a corresponding respective one of the above-mentioned three equal, mutually-orthogonal force components of the horizontal vibration force $V_1$. Resultantly, vibration forces equal to 0.577 times the magnitude of vibration force $V_1$ are applied simultaneously to test object 21 along each of the three mutually-orthogonal X, Y and Z axes thereof. Test object 21 may, therefore be vibration tested along its X, Y and Z axes simultaneously.

The vibration test fixture illustrated in FIG. 3 provides the same simplified vibration testing as the fixture illustrated in FIGS. 1 and 2, inasmuch as a test object being tested using the alternate embodiment of the test fixture does not have to be repositioned for testing along each of its three mutually-orthogonal axes.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A vibration test fixture for supporting an object to be vibration tested, said vibration test fixture being designed for use with a conventional shaker table assembly capable of generating a vibration force which extends along a predetermined vibration axis, said shaker table assembly having a substantially flat mounting table surface which extends substantially normally to said vibration axis, said vibration test fixture comprising:

support means, having a substantially flat surface, for releasably supporting a test object having mutually orthogonal X, Y and Z axes so that (a) said X, Y and Z axes are in fixed relationship to said support means, (b) said X and Y axes form about a 45 degree angle with respect to a first axis that extends in parallel with said flat surface, and (c) said X and Y axes lie along a plane that extends in parallel with said flat surface; and attachment means for providing a vibration transmissive connection between said substantially flat surface and said table surface so that said Z axis of said test object forms an angle $\theta$ equal to about 35.3° with the plane of said table surface.

2. A fixture according to claim 1, said support means comprising a connection means for releasably connecting said object to said flat surface so that said X axis of said object forms about a 45 degree angle with respect to said first axis.

3. A fixture according to claim 1 further comprising mounting means attached to said flat surface for releasably supporting said object to be vibration tested in fixed orthogonal relationship with respect to said table surface of said shaker table assembly.

4. A vibration test fixture for supporting an object to be vibration tested, said object having mutually-orthogonal X, Y and Z axes, said vibration test fixture being designed for use with a conventional shaker table assembly capable of generating a vibration force which extends along a vibration axis, said shaker table assembly having a substantially flat mounting table surface which extends substantially normally to said vibration axis, said vibration test fixture comprising:

a mounting plate having a substantially flat surface and a substantially straight bottom edge;

attachment fixtures adapted to releasably support said object so that (a) said X, Y and Z axes are in fixed relationship to said flat surface, (b) said X and Y axes of said object form about a 45 degree angle with respect to said straight bottom edge, and (c) said X and Y axes lie along a plane that extends in parallel with said flat surface; and a bracket couplable to said mounting plate and to said mounting table surface of said shaker table assembly, said bracket being designed to transmit vibration from said shaker table assembly to said mounting plate and to support said flat surface of said mounting plate at about a 54.7 degree angle with respect to said mounting table surface of said shaker table assembly.

5. A vibration test apparatus for simultaneously applying a trio of vibration forces to an object having mutually-orthogonal X, Y and Z axes so that a corresponding respective one of said trio of vibration forces extends in parallel with each of said X, Y and Z axes of said object, said apparatus comprising:

a shaker table assembly for generating a vibration force which extends along a vibration axis, said shaker table assembly having a mounting table surface which extends substantially normally to said vibration axis;

support means, having a substantially flat surface, for releasably supporting an object to be vibration tested having mutually orthogonal X, Y and Z axes so that (a) said X, Y and Z axes are in fixed relationship to said support means, (b) said X and Y axes of said object form about a 45 degree angle with respect to a first axis that extends in parallel with said flat surface, and (c) said X and Y axes lie along a plane that extends in parallel with said flat surface; and attachment couplable to said support means and to said mounting table surface of said shaker table assembly for providing a vibration transmissive connection between said flat surface and said mounting table surface of said shaker table assembly and for supporting said support means so that said Z axis of said object secured to said support means forms about a 35.3 degree angle with respect to a plane extending along said mounting table surface.

6. A vibration test fixture for supporting an object to be vibration tested, said vibration test fixture being designed for use with a conventional sliptable assembly capable of generating a vibration force which extends along a vibration axis, said sliptable assembly having a substantially flat mounting table surface which extends substantially parallel to said vibration axis, said vibration test fixture comprising:

support means, having a substantially flat surface, for releasably supporting an object to be vibration tested having mutually orthogonal X, Y and Z axes so that (a) said X, Y and Z axes are in fixed relationship to said support means, (b) said X and Y axes of said object form about a 45 degree angle with respect to a first axis that extends in parallel with said flat surface, and (c) said X and Y axes lie along a plane that extends in parallel with said flat surface; and attachment means couplable to said support means and to said mounting table surface of said sliptable assembly for providing a vibration transmissive connection between said flat surface and said mounting table surface of said sliptable assembly so that said Z axis of said object forms an angle $\theta$ equal to about 54.7° with the plane of said mounting table surface.

7. A fixture according to claim 6, said support means comprising a connection means for releasably connecting said object to said flat surface so that said X axis of said object forms about a 45 degree angle with respect to said first axis.

8. A fixture according to claim 6 further comprising mounting means attached to said support means for releasably supporting said object to be vibration tested in fixed orthogonal relationship with respect to said flat mounting table surface of said sliptable assembly.

9. A vibration test fixture for supporting an object to be vibration tested, said object having mutually-orthogonal X, Y and Z axes, said vibration test fixture being designed for use with a conventional sliptable assembly capable of being vibrated along a vibration axis, said sliptable assembly having a substantially flat mounting table surface which extends substantially parallel to said vibration axis, said vibration test fixture comprising:

a mounting plate having a substantially flat surface and a substantially straight bottom edge;

attachment fixtures adapted to releasably support said object so that (a) said X, Y and Z axes are in fixed relationship to said flat surface, (b) said X and Y axes of said object form about a 45 degree angle with respect to said straight bottom edge, and (c) said X and Y axes lie along a plane that extends in parallel with said flat surface; and a bracket couplable to said mounting plate and to said mounting table surface of said sliptable assembly, said bracket being designed to transmit vibration from said sliptable assembly to said mounting plate and to support said flat surface of said mounting plate at about a 35.3 degree angle with respect to said mounting table surface of said sliptable assembly.

10. A vibration test apparatus for simultaneously applying a trio of vibration forces to an object having mutually-orthogonal X, Y and Z axes so that a corresponding respective one of said trio of vibration forces extends in parallel with each of said X, Y and Z axes of said object, said apparatus comprising:

a sliptable assembly for generating a vibration force which extends along a vibration axis, said sliptable assembly having a mounting table surface which extends substantially parallel to said vibration axis;

support means, having a substantially flat surface, for releasably supporting an object to be vibration tested having mutually orthogonal X, Y and Z axes so that (a) said X, Y and Z axes are in fixed relationship to said flat surface, (b) so that said X and Y axes of said object form about a 45 degree angle with respect to a first axis that extends in parallel with said mounting surface, and (c) said X and Y axes lie along a plane that extends in parallel with said flat surface; and attachment means couplable to said support means and to said mounting table surface of said sliptable assembly for providing a vibration transmissive connection between said flat surface and said mounting table surface of said sliptable assembly so that said Z axis of said object secured to said surface means forms about a 54.7 degree angle with respect to a plane extending along said mounting table surface.

* * * * *